Patented Apr. 3, 1934

1,953,104

UNITED STATES PATENT OFFICE

1,953,104

ADHESIVE

William Hale Charch, Buffalo, William L. Hyden, Kenmore, and Theron G. Finzel, Buffalo, N. Y., assignors to Du Pont Cellophane Company, Inc., New York, N. Y., a corporation of Delaware No Drawing. Application January 27, 1930, Serial No. 423,880

14 Claims. (Cl. 87—17)

This invention relates to an adhesive and more particularly to an adhesive adapted to be used with materials formed of or containing cellulose derivatives, whereby said materials may be secured or joined to similar or non-similar materials.

Recently, there has appeared on the market a material which comprises a sheet or film of regenerated cellulose combined with a moisture proofing composition. In one of the modifications, the material is provided (on one or both sides) with a very thin surface coating of the moisture proofing composition, said composition comprising a cellulose derivative, a gum or resin, a wax, and a plasticizer. This material, in addition to successfully resisting to a substantial degree the diffusion of moisture or water vapor therethrough for a substantial period of time, is also transparent, flexible, odorless and non-tacky. By virtue of these characteristics, this material has found extensive use as a wrapping tissue, particularly for wrapping articles which are apt to deteriorate by gain or loss of moisture. In wrapping such articles to obtain optimum results, it is desirable that the material completely envelope said articles and be sealed.

Due to the composition of the surface coating, none of the known adhesives render the material sufficiently tacky, whereby a seal may be effected. In many instances the known adhesives impair and destroy one or more of the desirable characteristics. In securing or joining the material to cellulosic materials, such as paper, cardboard, fabrics, and analogous bodies, difficulties similar to those set forth are also encountered.

It is therefore an object of this invention to provide an adhesive composition which upon setting forms a transparent film and is capable of use with materials formed of or containing a cellulose derivative.

Another object of this invention is to provide an adhesive composition which upon setting forms a transparent film and is adapted to be used in joining transparent moisture proof sheets of regenerated cellulose together or to other materials without impairing or destroying any of the desirable characteristics of said sheets.

Other objects will appear from the following description and appended claims.

We have found that an adhesive overcoming the above-mentioned defects can be prepared from rubber, preferably a colloidal solution of rubber or other similar resin solution, and a water-soluble agglutinant with or without a solvent for cellulose derivatives, said solvent also being water-soluble, by emulsifying the two compositions preferably with the aid of a suitable peptizing agent which is non-resinous in character.

In practising the invention, a dispersion or colloidal solution of rubber containing more than 5%, and preferably approximately 45%, is prepared in any of the well-known ways. For instance, it may be produced as described by Trumbull in "Colloid Symposium Monograph VI", pages 215–224 (Chemical Catalog Company, New York, 1928). A peptizing agent is introduced in the rubber dispersion and, after thorough mixing, the water-soluble agglutinant is added. The agitation is continued until the desired emulsification is effected. Finally, if desired, the water-soluble solvent for cellulose derivatives is added.

Various proportions of the ingredients constituting the adhesive may be utilized. We have found that the following ingredients in approximately the following parts by weight produce satisfactory results:

| | Parts |
|---|---|
| Aqueous dispersion of rubber (45% rubber) | 1.0– 50.0 |
| Water-soluble agglutinant | 5.0–100.0 |
| Peptizer | 0.5– 17.0 |
| Water-soluble solvent for cellulose derivatives | 0.0– 15.0 |

To more clearly illustrate our invention, the following specific examples, prepared as above described, are set forth. It is to be understood that these examples do not limit the invention in any manner whatsoever but merely illustrate certain modifications of the same:

| | Range | Preferred |
|---|---|---|
| | Parts by weight | Parts by weight |
| 1. Aqueous dispersion of rubber (45% rubber) | 3– 50 | 20 |
| Water-soluble agglutinant | 25–100 | 50 |
| Condensed glycerol | 1– 17 | 10 |
| 2. Aqueous dispersion of rubber (45% rubber) | 1.0– 15 | 5 |
| Water-soluble agglutinant | 5.0– 50 | 15 |
| Triethanolamine | 0.5– 6 | 2 |
| Ethyl lactate | 1.0– 15 | 5 |
| 3. Aqueous dispersion of rubber (45% rubber) | 1– 15 | 5 |
| Water-soluble agglutinant | 5– 50 | 15 |
| Glycerol | 1– 10 | 3 |
| Ethyl lactate | 1– 15 | 5 |

As a water-soluble agglutinant any of a large number of known compositions may be used, but to clearly define the above examples there is hereinafter set forth certain specific examples which have given successful results:

|  | Range | Preferred |
|---|---|---|
| 1. Starch, such as | *Parts* | *Parts* |
| Cornstarch | 5.0– 20 | 10 |
| Dextrin | 0.5– 10 | 2 |
| Water | 20.0–200 | 63 |
| 2. Starch, such as |  |  |
| Cornstarch | 5.0– 20 | 3 |
| Dextrin | 0.5– 10 | 1 |
| Gum arabic | 2.0– 30 | 4 |
| Water | 20.0–200 | 22 |

It is apparent that various other materials may be used instead of or in combination with those specifically set forth in the examples. For example, the aqueous dispersion of rubber may be replaced, wholly or in part, by rubber latex.

In a like manner, various other water-soluble agglutinants may be substituted wholly or partly for those specifically mentioned. Among the materials which have been satisfactory are gelatin and casein. When the latter is used, it may be necessary to render it soluble in water. This can be effected by the use of alkalis in the manner well known. The triethanolamine, glycerol and condensed glycerol may be wholly or partly substituted by other non-resinous peptizing agents. In place of the ethyl lactate, any substance which is a solvent of cellulose derivatives may be used, provided the solvent is also miscible with water. If desired, a plurality of solvents may be used.

The resulting adhesives are miscible with water and deposit transparent films on setting. They have been found to produce satisfactory results in securing transparent moisture proof sheets or films of regenerated cellulose together. The adhesive may also be used to join or unite moisture proof sheets or films of regenerated cellulose or dissimilar materials, such as paper, fabrics, cardboard and the like. It is obvious that these adhesives may also be used to secure any article of manufacture having a surface formed of or containing cellulose derivatives to the various materials herein set forth.

Since it is obvious that various modifications and changes may be made in the specific details hereinabove described, this invention is not restricted thereto except as defined in the appended claims.

We claim:

1. An adhesive adapted to deposit a transparent film and be used for sealing, joining or uniting materials having surfaces formed of a composition comprising a cellulose derivative to both similar and dissimilar materials comprising rubber, a water-soluble agglutinant and a non-resinous peptizer.

2. An adhesive adapted to deposit a transparent film and be used for sealing, joining or uniting materials having surfaces formed of a composition comprising a cellulose derivative to both similar and dissimilar materials comprising rubber, a water-soluble agglutinant including starch and a non-resinous peptizer.

3. An adhesive adapted to deposit a transparent film and be used for sealing, joining or uniting materials having surfaces formed of a composition comprising a cellulose derivative to both similar and dissimilar materials comprising rubber, a water-soluble agglutinant and a non-resinous peptizer, said water-soluble agglutinant comprising the following ingredients in approximately the following parts by weight:

|  | Parts |
|---|---|
| Cornstarch | 5.0– 20.0 |
| Dextrin | 0.5– 10.0 |
| Water | 20.0–200.0 |

4. An adhesive adapted to deposit a transparent film and be used for sealing, joining or uniting materials having surfaces formed of a composition comprising a cellulose derivative to both similar and dissimilar materials comprising rubber, a water-soluble agglutinant, a non-resinous peptizer and a solvent for cellulose derivatives, said solvent being miscible with water.

5. An adhesive adapted to deposit a transparent film and be used for sealing, joining or uniting materials having surfaces formed of a composition comprising a cellulose derivative to both similar and dissimilar materials comprising rubber, a water-soluble agglutinant including a starch, a non-resinous peptizer and a solvent for cellulose derivatives, said solvent being miscible with water.

6. An adhesive adapted to deposit a transparent film and be used for sealing, joining or uniting materials having surfaces formed of a composition comprising a cellulose derivative to both similar and dissimilar materials comprising rubber, a water-soluble agglutinant, a non-resinous peptizer and a water-soluble solvent for cellulose derivatives, said water-soluble agglutinant comprising the following ingredients in approximately the following parts by weight:

|  | Parts |
|---|---|
| Cornstarch | 5.0– 20.0 |
| Dextrin | 0.5– 10.0 |
| Water | 20.0–200.0 |

7. An adhesive adapted to deposit a transparent film and be used for sealing, joining or uniting materials having surfaces formed of a composition comprising a cellulose derivative to both similar and dissimilar materials comprising the following ingredients in approximately the following parts by weight:

|  | Parts |
|---|---|
| Dispersion of rubber in water (45% rubber) | 1.0– 50.0 |
| Water-soluble agglutinant | 5.0–100.0 |
| Peptizer | 0.5– 17.0 |
| Water-soluble solvent for cellulose derivatives | 0.0– 15.0 |

8. An adhesive adapted to deposit a transparent film and be used for sealing, joining or uniting materials having surfaces formed of a composition comprising a cellulose derivative to both similar and dissimilar materials comprising the following ingredients in approximately the following parts by weight:

|  | Parts |
|---|---|
| Dispersion of rubber in water (45% rubber) | 1.0– 50.0 |
| Water-soluble agglutinant containing starch and dextrin | 5.0–100.0 |
| Peptizer | 0.5– 17.0 |
| Water-soluble solvent for cellulose derivatives | 0.0– 15.0 |

9. An adhesive adapted to deposit a transparent film and be used for sealing, joining or uniting materials having surfaces formed of a composition comprising a cellulose derivative to both similar and dissimilar materials comprising the following ingredients in approximately the folowing parts by weight:

| | Parts |
|---|---|
| Aqueous dispersion of rubber (45% rubber) | 3– 50 |
| Water-soluble agglutinant | 25–100 |
| Condensed glycerol | 1– 17 |

10. An adhesive adapted to deposit a transparent film and be used for sealing, joining or uniting materials having surfaces formed of a composition comprising a cellulose derivative to both similar and dissimilar materials comprising the following ingredients in approximately the following parts by weight:

| | Parts |
|---|---|
| Aqueous dispersion of rubber (45% rubber) | 20 |
| Water-soluble agglutinant | 50 |
| Condensed glycerol | 10 |

11. An adhesive adapted to deposit a transparent film and be used for sealing, joining or uniting materials having surfaces formed of a composition comprising a cellulose derivative to both similar and dissimilar materials comprising the following ingredients in approximately the following parts by weight:

| | Parts |
|---|---|
| Aqueous dispersion of rubber (45% rubber) | 1.0–15 |
| Water-soluble agglutinant | 5.0–50 |
| Triethanolamine | 0.5– 6 |
| Ethyl lactate | 1.0–15 |

12. An adhesive adapted to deposit a transparent film and be used for sealing, joining or uniting materials having surfaces formed of a composition comprising a cellulose derivative to both similar and dissimilar materials comprising the following ingredients in approximately the following parts by weight:

| | Parts |
|---|---|
| Aqueous dispersion of rubber (45% rubber) | 5 |
| Water-soluble agglutinant | 15 |
| Triethanolamine | 2 |
| Ethyl lactate | 5 |

13. An adhesive adapted to deposit a transparent film and be used for sealing, joining or uniting materials having surfaces formed of a composition comprising a cellulose derivative to both similar and dissimilar materials comprising the following ingredients in approximately the following parts by weight:

| | Parts |
|---|---|
| Aqueous dispersion of rubber (45% rubber) | 1–15 |
| Water-soluble agglutinant | 5–50 |
| Glycerol | 1–10 |
| Ethyl lactate | 1–15 |

14. An adhesive adapted to deposit a transparent film and be used for sealing, joining or uniting materials having surfaces formed of a composition comprising a cellulose derivative to both similar and dissimilar materials comprising the following ingredients in approximately the following parts by weight:

| | Parts |
|---|---|
| Aqueous dispersion of rubber (45% rubber) | 5 |
| Water-soluble agglutinant | 15 |
| Glycerol | 3 |
| Ethyl lactate | 5 |

WILLIAM HALE CHARCH.
WILLIAM L. HYDEN.
THERON G. FINZEL.